US009647742B2

(12) United States Patent
Black

(10) Patent No.: US 9,647,742 B2
(45) Date of Patent: May 9, 2017

(54) ANTENNA ARCHITECTURE AND OPERATIONAL METHOD FOR RF TEST CONNECTOR REDUCTION

(71) Applicant: Google Technology Holdings LLC, Mountain View, CA (US)

(72) Inventor: Gregory R. Black, Vernon Hills, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 235 days.

(21) Appl. No.: 14/446,774

(22) Filed: Jul. 30, 2014

(65) Prior Publication Data

US 2016/0037359 A1    Feb. 4, 2016

(51) Int. Cl.

| G01R 31/08 | (2006.01) |
|---|---|
| H04B 7/06 | (2006.01) |
| H04L 5/08 | (2006.01) |
| H04B 3/46 | (2015.01) |
| H04B 7/08 | (2006.01) |

(52) U.S. Cl.
CPC ............ *H04B 7/0613* (2013.01); *H04B 3/46* (2013.01); *H04B 7/0837* (2013.01); *H04L 5/08* (2013.01); *H04B 7/0825* (2013.01)

(58) Field of Classification Search
CPC ....... H04W 24/02; H04B 3/46; H04B 7/0613; H04L 5/08
See application file for complete search history.

(56) References Cited

U.S. PATENT DOCUMENTS

| 8,594,584 B2 | 11/2013 | Greene et al. | |
|---|---|---|---|
| 8,626,083 B2 | 1/2014 | Greene et al. | |
| 2003/0124982 A1* | 7/2003 | Saari ................... | H04B 7/0689 455/67.14 |
| 2004/0072542 A1* | 4/2004 | Sanford ................ | H04B 1/406 455/73 |
| 2004/0192222 A1* | 9/2004 | Vaisanen ................ | H04B 1/44 455/78 |
| 2007/0123174 A1* | 5/2007 | Wiessner ............... | H04B 17/16 455/73 |

(Continued)

*Primary Examiner* — Chirag Shah
*Assistant Examiner* — Jael Ulysse
(74) *Attorney, Agent, or Firm* — Faegre Baker Daniels LLP

(57) ABSTRACT

A method and system configures a wireless communication device to support various radio frequency test modes. A controller determines whether an RF test cable is connected between test equipment and a test connector while a corresponding transceiver(s) is operating. In response to determining that the RF test cable is connected between test equipment and the test connector while the corresponding transceiver is operating, the controller provides an antenna tuner configuration(s) corresponding to the operating transceivers to support a test mode which, for example, can include any of a carrier aggregation (CA) test mode and a diversity transmission test mode. However, if the RF test cable is not connected between test equipment and the test connector while the corresponding transceiver(s) is operating, the controller determines an antenna tuner configuration corresponding to a normal/non-test device communication mode. The controller configures the antenna tuner(s) using the determined antenna tuner configuration(s).

20 Claims, 6 Drawing Sheets

(56) References Cited

U.S. PATENT DOCUMENTS

| | | | |
|---|---|---|---|
| 2009/0285135 A1* | 11/2009 | Rousu | H04B 1/0057 370/297 |
| 2011/0014958 A1* | 1/2011 | Black | H01Q 1/243 455/575.7 |
| 2011/0065400 A1* | 3/2011 | Teikari | G01S 3/20 455/129 |
| 2011/0116423 A1* | 5/2011 | Rousu | H01Q 1/242 370/297 |
| 2012/0115553 A1* | 5/2012 | Mahe | H04B 7/0825 455/575.7 |
| 2013/0051284 A1* | 2/2013 | Khlat | H04L 5/00 370/277 |
| 2013/0084852 A1* | 4/2013 | Duperray | H04B 17/0027 455/425 |
| 2013/0222205 A1* | 8/2013 | Manssen | H03H 7/40 343/861 |
| 2013/0234741 A1* | 9/2013 | Mow | H01Q 1/243 324/750.01 |
| 2013/0241666 A1* | 9/2013 | Granger-Jones | H01P 1/15 333/101 |
| 2013/0271328 A1* | 10/2013 | Nickel | G01R 29/10 343/703 |
| 2013/0328582 A1 | 12/2013 | Han et al. | |
| 2013/0331042 A1* | 12/2013 | See | H04B 17/12 455/77 |
| 2014/0087668 A1* | 3/2014 | Mow | H04W 24/00 455/67.14 |
| 2014/0119244 A1* | 5/2014 | Steer | H04B 1/525 370/278 |
| 2014/0179239 A1* | 6/2014 | Nickel | H04W 24/00 455/67.14 |
| 2014/0242918 A1* | 8/2014 | Weissman | H01Q 3/26 455/67.14 |
| 2014/0302797 A1* | 10/2014 | Han | H04W 24/06 455/67.14 |
| 2015/0171955 A1* | 6/2015 | Olesen | H04B 7/265 370/252 |
| 2015/0172938 A1* | 6/2015 | Lehtinen | H04B 1/54 455/77 |

* cited by examiner

ANTENNA ARCHITECTURE AND OPERATIONAL METHOD FOR RF TEST CONNECTOR REDUCTION

BACKGROUND

1. Technical Field

The present disclosure relates in general to wireless communication devices and in particular to radio frequency (RF) testing circuitry in wireless communication devices.

2. Description of the Related Art

Simultaneous signal propagation is a requirement for many communication network operators. While the sizes of wireless communications devices decrease, the challenge of providing high performance signal propagation continues. In addition, wireless communication devices are constantly integrating additional features and capabilities. With limited real estate, designers of wireless communication devices are tasked with optimizing antenna matching and isolation to satisfy specified high performance requirements.

Enhancing device performance involves radio frequency (RF) testing which is performed to determine the RF performance of an RF communication circuit. RF test systems utilize external RF test equipment which is generally connected via coaxial cables to a test connector port coupled to the RF signal path. In conventional systems, low and high band RF testing for communication devices utilizing multiple antenna systems is performed using multiple test connectors connected to each of the multiple transceiver output ports. The use of multiple connectors corresponding to the multiple frequency bands presents a serious challenge to designers of these devices who must incorporate RF test circuitry within the already limited real estate.

BRIEF DESCRIPTION OF THE DRAWINGS

The described embodiments are to be read in conjunction with the accompanying drawings, wherein.

DETAILED DESCRIPTION

Figure 1:
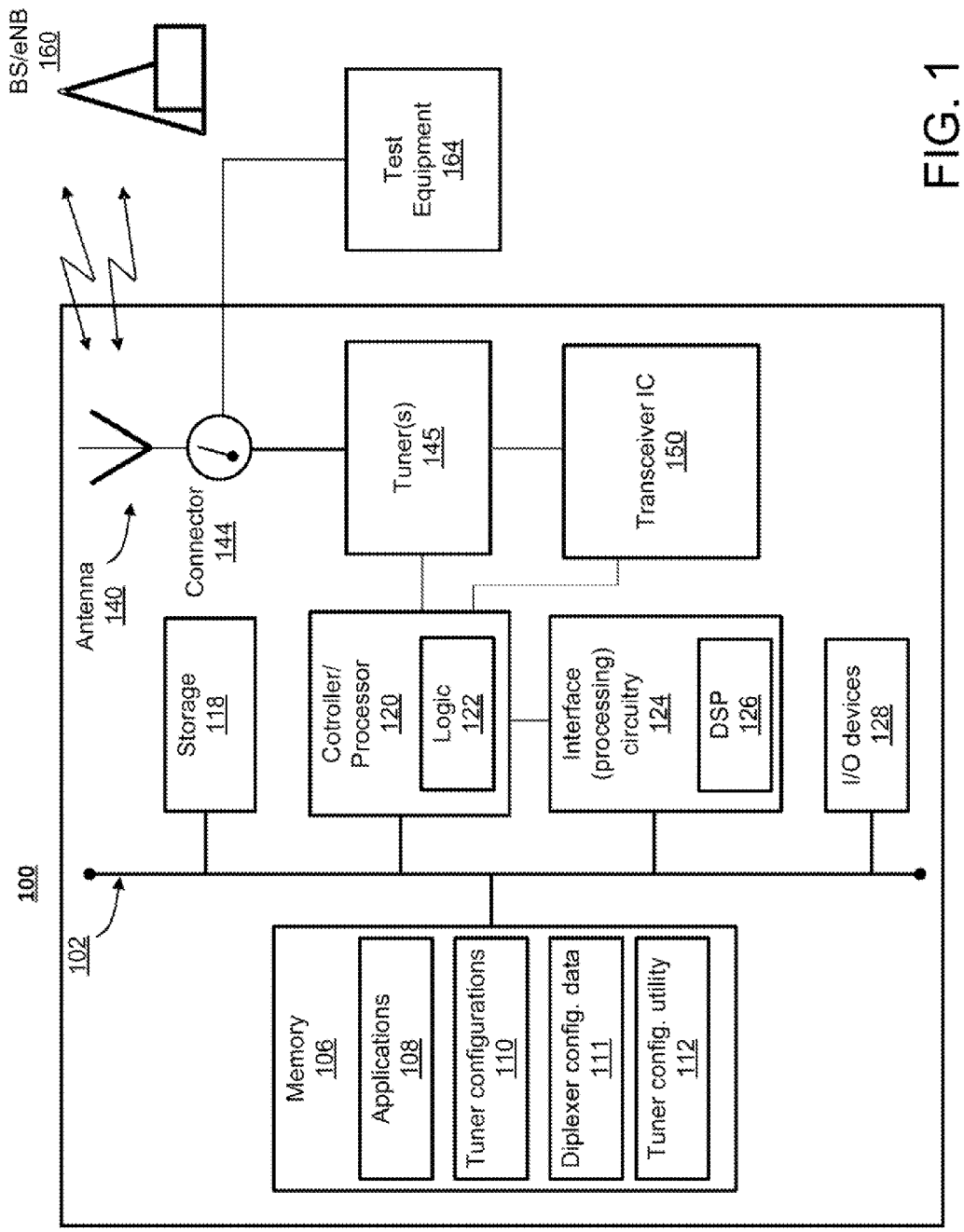
FIG. 1 is a block diagram illustrating an example wireless communication device within which the various features of the described embodiments can be advantageously implemented, according to one embodiment.

The illustrative embodiments provide a method and system for configuring a wireless communication device to support various radio frequency test modes. A controller determines whether an RF test cable is connected between test equipment and a test connector while a corresponding transceiver(s) is operating. In response to determining that the RF test cable is connected between test equipment and the test connector while the corresponding transceiver is operating, the controller provides an antenna tuner configuration(s) corresponding to the operating transceivers to support a test mode. The test mode can include any of a carrier aggregation (CA) test mode and a diversity transmission test mode, for example. However, if the RF test cable is not connected between test equipment and the test connector while the corresponding transceiver(s) is operating, the controller determines an antenna tuner configuration corresponding to a normal or non-test device communication mode. The controller configures the antenna tuner(s) using the determined antenna tuner configuration(s).

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein.

With specific reference now to FIG. 1, there is depicted a block diagram of an example wireless communication device 100, within which the functional aspects of the described embodiments may be implemented. Wireless communication device 100 represents a device that is adapted to transmit and receive electromagnetic signals over an air interface via uplink and/or downlink channels between the wireless communication device 100 and communication network equipment (e.g., base-station 160) utilizing a plurality of different communication standards, such as Global System for Mobile Communications (GSM) Code Division Multiple Access (CDMA), Orthogonal Frequency Division Multiple Access (OFDMA), and similar systems. In addition, wireless communication device 100 is able to utilize a number of communication means (e.g., carrier aggregation, simultaneous voice and LTE (SVLTE), and dual SIM dual active (DSDA)) that concurrently enables simultaneous signal propagation. In one or more embodiments, the wireless communication device can be a mobile cellular device/phone or smartphone, or laptop, netbook or tablet computing device, or other types of communications devices. Wireless communication device 100 comprises processor 120 and interface circuitry 124, which are connected to memory component 106 via signal bus 102. Interface circuitry 124 includes digital signal processor (DSP) 126. In addition, wireless communication device 100 comprises storage 118. Also illustrated within wireless communication device 100 are input/output (I/O) devices 128. Wireless communication device 100 also includes transceiver IC 150 for sending and receiving communication signals. In at least some embodiments, the sending and receiving of communication signals occur wirelessly and are facilitated by one or more antennas 140 coupled to transceiver integrated circuit (IC) 150. The number of antennas can vary from device to device, ranging from one to multiple antennas, and the presentation within wireless communication device 100 of one antenna 140 is merely for illustration. Test equipment 164 is also illustrated within wireless communication device 100.

Wireless communication device 100 is able to wirelessly communicate to base-station 160 via antenna 140. Base station 160 can be any one of a number of different types of network stations and/or antennas associated with the infrastructure of the wireless network and configured to support uplink and downlink communication via one or more of the wireless communication protocols, as known by those skilled in the art.

Transceiver IC 150 comprises at least one transmitter (not shown) and at least one receiver (not shown). In one implementation, controller 120 is communicatively coupled to tuner(s) 145. In one implementation, controller/processor 120 provides local processor functionality and includes a local processor (not shown), which may be described as a digital signal processor (DSP). In addition, controller 120 comprises a memory or storage system (not shown). In one embodiment, controller 120 also includes logic 122 to provide configuration support for RF conductor tests within wireless communication device 100. According to one aspect of the disclosure, local memory/storage includes firmware, such as tuner configuration utility 112, which supports the various processing functions of controller 120. The functions of controller 120 and the structural makeup of the antenna tuners are described in greater detail in FIG. 2.

In addition to the above described hardware components of wireless communication device 100, various features of the invention may be completed or supported via software or firmware code and/or logic stored within at least one of memory 106 and local memory, and respectively executed by DSP 126 or processor 120, or local processor of controller 120. Thus, for example, included within system memory 106 and/or local memory are a number of software, firmware, data logic components, or modules, including applications 108, tuner configuration data 110, duplexer configuration data 111 and tuner configuration utility 112.

The various hardware components within wireless communication device 100 can be electrically and/or communicatively coupled together as illustrated in FIG. 1. As utilized herein, the term "communicatively coupled" means that information signals are transmissible through various interconnections between the components. The interconnections between the components can be direct interconnections that include conductive transmission media, or may be indirect interconnections that include one or more intermediate electrical components. Although certain direct interconnections are illustrated in FIG. 1, it is to be understood that more, fewer or different interconnections may be present in other embodiments.

Figure 2:
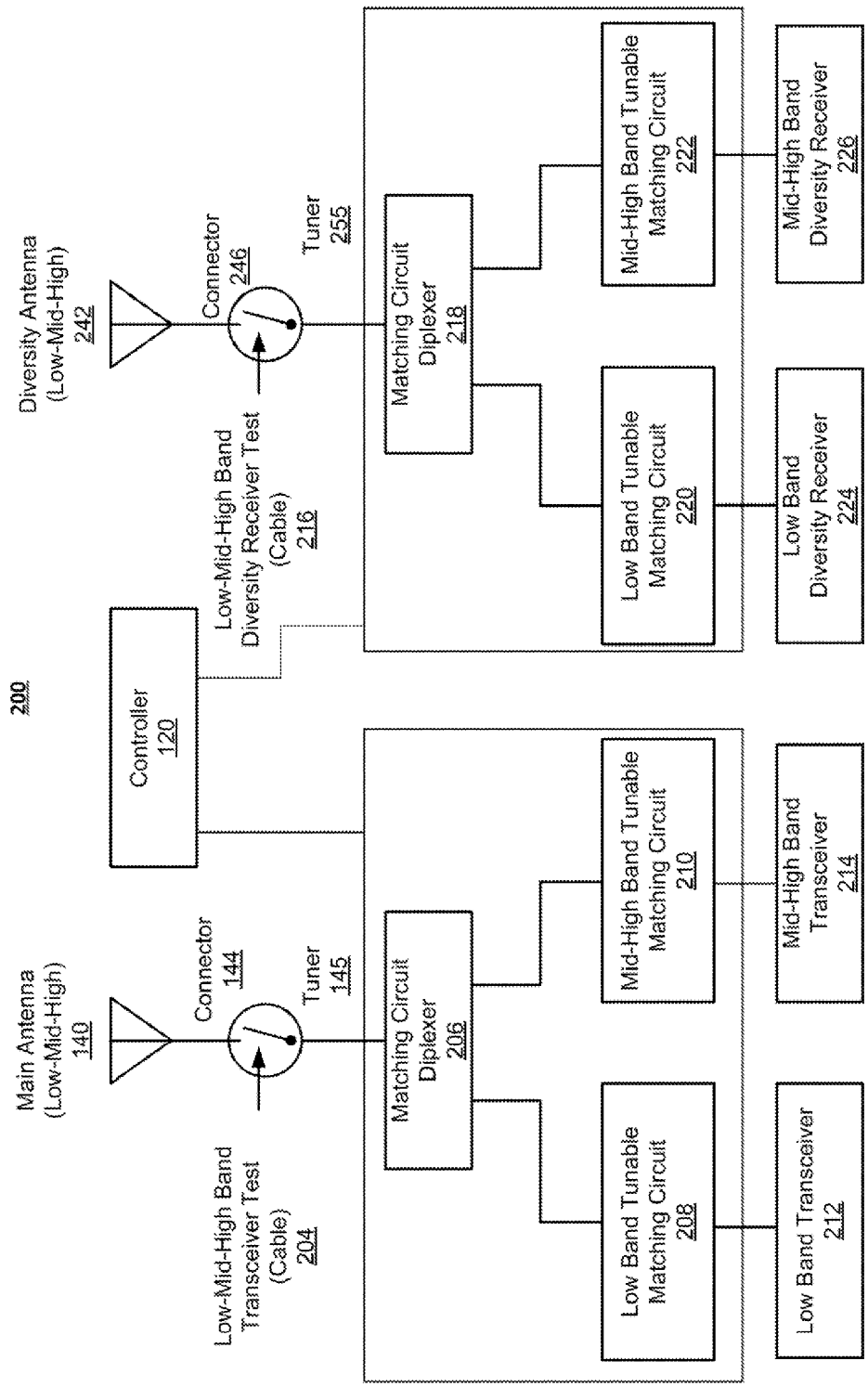
FIG. 2 provides a block diagram representation of a structural configuration of a radio frequency front end (RFFE) system within a wireless communication device, according to one embodiment.

FIG. 2 provides a block diagram representation of a structural configuration of a radio frequency front end (RFFE) system within a wireless communication device, according to one embodiment. RFFE 200 comprises first RF transceiver or low band transceiver 212, which includes first RF transmitter (TX) (not shown) and first RF receiver (RX) (not shown). RFFE 200 also comprises first tunable low band tunable matching circuit 208 which is coupled to low band transceiver 212. RFFE 200 further comprises second RF transceiver or mid-high band transceiver 214, which includes second RF transmitter (TX) (not shown) and second RF receiver (RX) (not shown). RFFE 200 also comprises first tunable mid-high band tunable matching circuit 210 which is coupled to mid-high band transceiver 214. In addition, RFFE 200 comprises first matching circuit diplexer 206 which is coupled to both first tunable low band antenna matching circuit 208 and to first tunable mid-high band antenna matching circuit 210. In one embodiment, first tunable low band antenna matching circuit 208, first tunable mid-high band antenna matching circuit 210 and first matching circuit diplexer 206 collectively constitute first tuner 145. First antenna tuner 145 operates to transform an impedance of first antenna 140 of wireless communication device 100 (FIG. 1). Additionally, RFFE 200 comprises first Low-Mid-High band transceiver test connector 144 which is also coupled to first matching circuit diplexer 206. Also illustrated within RFFE 200 is antenna 140 which is coupled to first Low-Mid-High band transceiver test connector 144.

RFFE 200 further comprises third RF transceiver or low band diversity receiver 224, which includes first RF transmitter (TX) (not shown) and first RF receiver (RX) (not shown). RFFE 200 also comprises second tunable low band antenna matching circuit 220 which is coupled to low band diversity receiver 224. RFFE 200 further comprises fourth RF transceiver or mid-high band diversity receiver 226, which includes second RF transmitter (TX) (not shown) and second RF receiver (RX) (not shown). RFFE 200 also comprises second mid-high band tunable matching circuit 222 which is coupled to mid-high band diversity receiver 226. In addition, RFFE 200 comprises second matching circuit diplexer 218 which is coupled to both second low band tunable matching circuit 220 and to second mid-high band tunable matching circuit 222. In one embodiment, second low band tunable matching circuit 220, second mid-high band tunable matching circuit 222 and second matching circuit diplexer 218 collectively constitute second antenna tuner 255. Second antenna tuner 255 operates to transform an impedance of second antenna 242 of wireless communication device 100. Additionally, RFFE 200 comprises second Low-Mid-High band transceiver test connector 246 which is also coupled to second matching circuit diplexer 218. Also illustrated within RFFE 200 is second antenna 242 which is coupled to second Low-Mid-High band transceiver test connector 246. RFFE 200 also includes controller 120 which is coupled to first antenna tuner 145 and second antenna tuner 255. In addition, controller 120 is coupled to the multiple transceivers, although this coupling is not shown in FIG. 2.

Controller 120 detects when a first RF test cable is connected to a first RF test connector, where the connection of first RF test cable results in removing the low band transceiver output connection and the high band transceiver output connection to the first antenna. In response to detecting that the first RF test cable is connected to the first RF test connector, controller 120 provides at least one configuration of a first set of antenna tuner configurations associated with a presence of the connected first RF test cable. However, in response to detecting that none of the RF test connectors is connected to a corresponding RF test cable and each active transceiver is connected to a corresponding antenna, controller 120 provides at least one configuration of a second set of antenna tuner configurations associated with each active transceiver being connected to a corresponding antenna.

The RF test connectors consist of coaxial connectors with internal mechanical switches. During normal operation (i.e., non-test, signal propagation mode), the internal switch is positioned such that the RF input from the corresponding transceiver connects to the antenna. However if an RF cable is plugged into the RF test connector, the internal switch changes its position such that the RF input from the transceiver connects to the RF cable and disconnects from the antenna. The low and high band transceiver test cables are typically 50 Ohm impedance cables, for connecting to test equipment having input impedance of 50 Ohms. Similarly, the low and high band transceivers typically have impedance of 50 Ohms. The low and high band tunable matching circuits are employed to transform the impedance of low and high band transceivers to the complex conjugate impedance of the antennas, which are different from 50 Ohms, thereby maximizing the transfer of signal power between the transceivers and the antennas.

Controller 120 determines whether at least one of the RF test connectors is connected to test equipment via a test cable. If controller 120 determines that a single RF test connector is connected to test equipment via test cables, controller 120 identifies the single test connector as a single test point and identifies, using a current transceiver configuration, an RF test that is being performed from among (a) one of a low band RF transmitter test and a high band RF transmitter test, (b) one of a low band RF receiver test and a high band RF receiver test, (c) low and high band RF transmitter tests, and (d) low and high band RF receiver tests. Controller 120 selects, based on the identified RF test, an antenna tuner configuration from among the first set of antenna tuner configurations. Controller 120 configures the corresponding antenna tuner using the selected antenna tuner configuration for the identified RF test in response to detecting that the test equipment is connected to the first RF test point via the RF test cable.

In one embodiment, the RF test is a carrier aggregation (CA) test performed using the single RF test point and which simultaneously utilizes a first propagation path corresponding to a low band transceiver and a second propagation path of a corresponding mid-high band transceiver. The first propagation path includes a path segment via the low band tunable matching circuit and the second propagation path includes a path segment via the high band tunable matching circuit. The matching circuit diplexer enables isolation of the simultaneously propagating RF test signals between the first low band transceiver and the first high band transceiver. The selected antenna tuner configuration enables both a low band and a high band transceiver to be matched and diplexed to test equipment connected to the single RF test point.

When an RF test cable is connected between a test point and a test connector, the first antenna matching circuit is coupled to RF test equipment that has a first known impedance which is substantially equivalent to each of a second impedance at a low band transceiver output and a third impedance at a mid-high band transceiver output, respectively. In one implementation, the first known impedance is 50 ohms and the single test point is a 50 ohm test point. When the RF test cable is not connected, the first antenna matching circuit is coupled to the first antenna having a fourth known impedance which is substantially different from the second and third impedances.

When multiple test points are operational, each of a first set of antenna tuner configurations associated with low and high band operation serves to convert the 50 ohm impedance at the low and high band transceiver to the 50 ohm impedance associated with RF test equipment connected to an RF test point. In addition, each of a second set of antenna tuner configurations associated with low and high band operation serves to convert the 50 ohm impedance at the low and high band transceiver to the complex conjugate of the fourth impedance corresponding to the antenna.

In one implementation, each antenna tuner configuration (e.g., tuner configuration 110) that is associated with an RF test cable being connected to an RF test connector is provided using at least one of a pre-established algorithm and a look-up table. Furthermore, controller 120 selects, using respective RF communication signal parameters, an antenna tuner configuration that is associated with an RF test being performed.

In one embodiment, controller 120 retrieves tuner configuration data 112 from memory, and data controller 120 utilizes the tuner configuration data 112 (FIG. 1) to configure tunable matching circuits 208, 210, 220 and 222. Additionally, controller 120 retrieves diplexer configuration data 111 (FIG. 1), which controller 120 utilizes to configure matching circuit diplexers 206 and 218.

Figure 3:
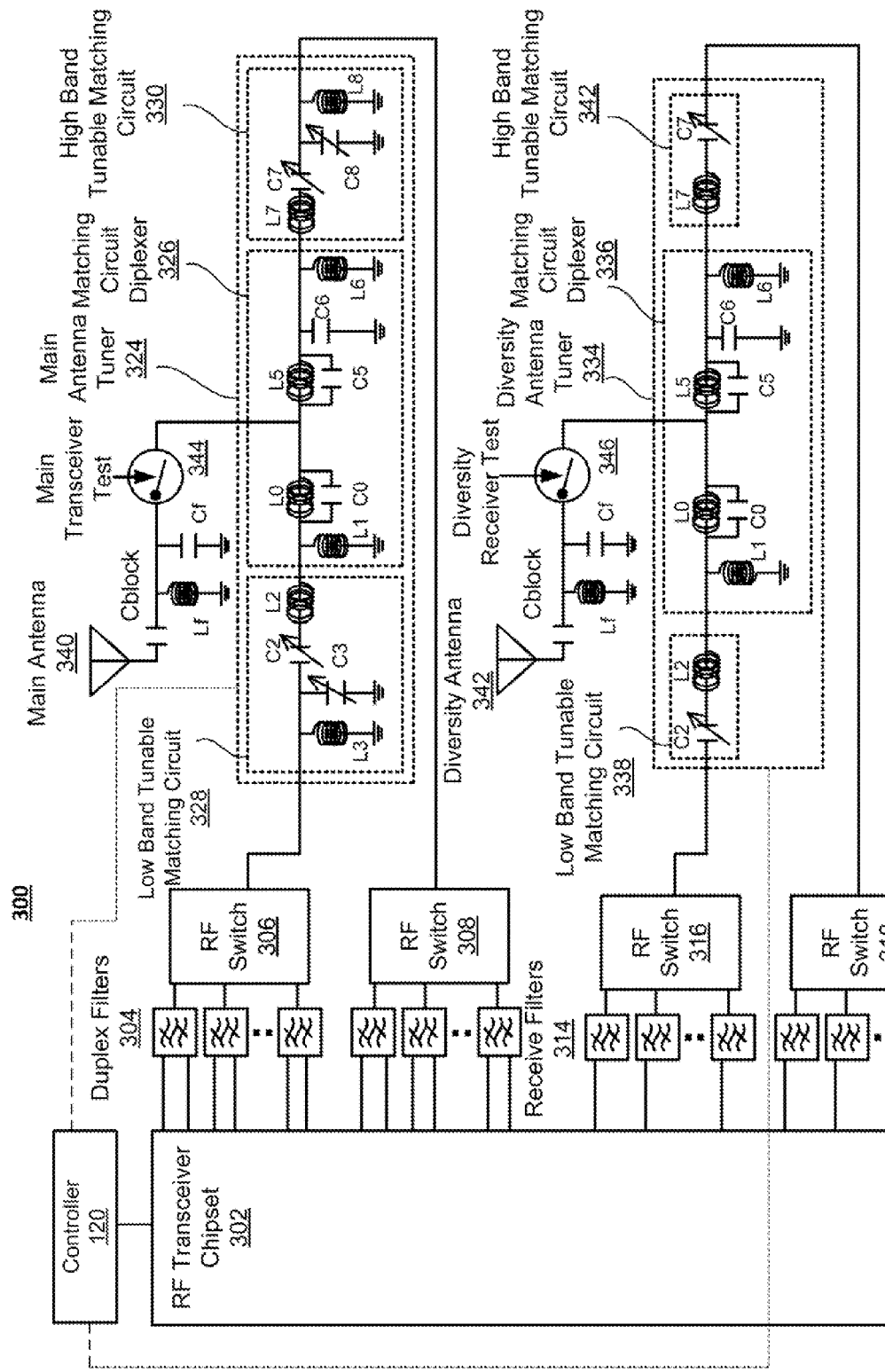
FIG. 3 provides a component level illustration of a RFFE, according to one embodiment.

FIG. 3 is a component level illustration of a RFFE, according to one embodiment. RFFE 300 comprises RF transceiver chipset 302 which comprises multiple low band transceivers (not explicitly shown) and multiple high band transceivers (not explicitly shown). RFFE 300 also comprises multiple duplex filters 304 which are respectively coupled to a first set of the multiple low band and high band transceivers. Duplex filters 304 operate to support full duplex transceiver operation by respectively removing transmit signals from a receive path into transceiver 302 and receive signals from a transmit path into transceiver 302. In addition, for the receive path, duplex filters block signals at a transmit frequency and enhance signals at a receive frequency. For the transmit path, the duplex filters block signals at a receive frequency and enhance signals at a transmit frequency. Additionally, RFFE 300 comprises multiple receive filters 314 which are respectively coupled to a second set of the multiple low band and high band transceivers. In an embodiment receive filters 314 which are respectively coupled to a set of multiple low band and high band diversity receivers.

RFFE 300 also comprises multiple RF switches. First RF switch 306 is communicatively coupled via duplex filters to low band transceiver ports, respectively. Second RF switch 308 is communicatively coupled via duplex filters to high band transceiver ports. Third RF switch 316 is communicatively coupled via receive filters to low band transceiver ports. Fourth RF switch 318 is communicatively coupled via receive filters to high band transceiver ports.

RFFE 300 also comprises main antenna tuner 324 which is coupled to both first RF switch 306 and second RF switch 308. Main antenna tuner 324 comprises first low band tunable matching circuit 328, first matching circuit diplexer 326 and first high band tunable matching circuit 330. Low band tunable matching circuit 328 and first high band tunable matching circuit 330 are coupled to first RF switch 306 and second RF switch 308, respectively.

First low band tunable matching circuit 328 comprises shunt inductor "L3", tunable shunt capacitor "C3" and first tunable series capacitor "C2", which are all coupled to first RF switch 306. In addition, first low band tunable matching circuit 328 comprises first series inductor "L2" coupled to first tunable series capacitor "C2".

First high band tunable matching circuit 330 comprises shunt inductor "L8", tunable shunt capacitor "C8" and first tunable series capacitor "C7", which are all coupled to second RF switch 308. In addition, first high band tunable matching circuit 330 comprises first series inductor "L7" coupled to first tunable series capacitor "C7".

Matching circuit diplexer 326 comprises first shunt inductor "L1" and a first series reactance comprising first inductor "L0" connected in parallel with first capacitor "C0". In one implementation, first shunt inductor "L1" and the first series reactance collectively represent a low band component. Matching circuit diplexer 326 further comprises a second series reactance comprising first inductor "L5" connected in parallel with first capacitor "C5". In addition, matching circuit diplexer 326 comprises first shunt capacitor "C6" and first shunt inductor "L6". In one implementation, the second series reactance, first shunt capacitor "C6" and first shunt inductor "L6" collectively represent a high band component. RFFE 300 also includes main transceiver test connector which is coupled to both the first series reactance and the second series reactance. RFFE 300 includes main antenna 340 which is communicatively coupled to main transceiver test connector 344.

In order to support a diversity receiver system, RFFE 300 further comprises diversity antenna tuner 334, which is coupled to both third RF switch 316 and fourth RF switch 318. Diversity antenna tuner 334 comprises second low band tunable matching circuit 338, second matching circuit diplexer 336, and second high band tunable matching circuit 342.

Second low band tunable matching circuit 338 comprises second tunable series capacitor "C2" and second series inductor "L2", which is coupled to second tunable series capacitor "C2". Second high band tunable matching circuit 342 comprises second tunable series capacitor "C7" and second series inductor "L7" coupled to first tunable series capacitor "C7".

Matching circuit diplexer 336 comprises second shunt inductor "L1" and a third series reactance, which comprises second inductor "L0" connected in parallel with second capacitor "C0". Matching circuit diplexer 336 further comprises a fourth series reactance comprising second inductor "L5" connected in parallel with second capacitor "C5". In addition, matching circuit diplexer 336 comprises second shunt capacitor "C6" and second shunt inductor "L6". RFFE 300 also includes diversity receiver test connector 346 which is coupled to both the third series reactance and the fourth series reactance. Furthermore, diversity receiver test connector 346 is located between the diversity antenna 342 and the diversity antenna tuner 334. RFFE 300 includes diversity antenna 342, which is communicatively coupled to diversity receiver test connector 346.

RFFE 300 also includes controller 120 which is coupled to main antenna tuner 324 and diversity antenna tuner 334. In addition, controller 120 is coupled to the multiple transceivers illustrated as RF transceiver chipset 302. In response to detecting that the first RF test cable is connected to the first RF test connector and at least one RF test connector is not connected to an RF test cable, controller 120 provides at least one configuration of a set of antenna tuner configurations associated with the first RF test cable being connected and at least one configuration of another set of antenna tuner configurations associated with at least one other RF test cable not being connected.

Controller 120 detects when a second RF test cable is connected to the second RF test connector, resulting in removing any associated transceiver output connection to the diversity antenna. In response to detecting that the second RF test cable is connected to the second RF test connector while the first RF test cable is connected to the first RF test connector, controller 120 provides a main antenna tuner configuration associated with the first antenna tuner and a diversity antenna tuner configuration associated with the second antenna tuner. Controller 120 provides configurations that support performance of an RF test for propagation of communication signals using the diversity antenna system.

Controller 120 configures the matching circuit diplexer to enable frequency separation for simultaneously propagating RF test signals, whereby the main and diversity antenna tuner configurations enable the first antenna tuner and the second antenna tuner to allow simultaneous low and high band operation with low loss to propagating RF test signals.

Figure 4:
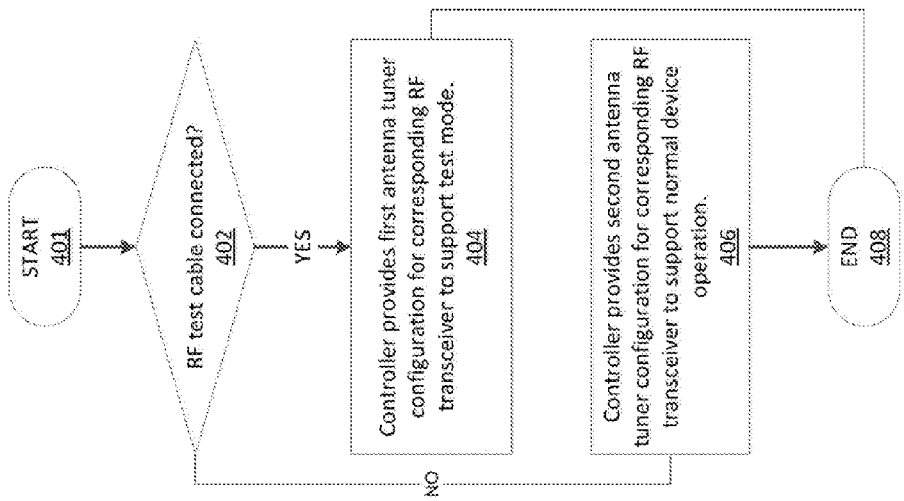
FIG. 4 is a flow chart illustrating one embodiment of a method for configuring a tunable antenna matching circuit to support a test mode, according to one embodiment.
Figure 5:
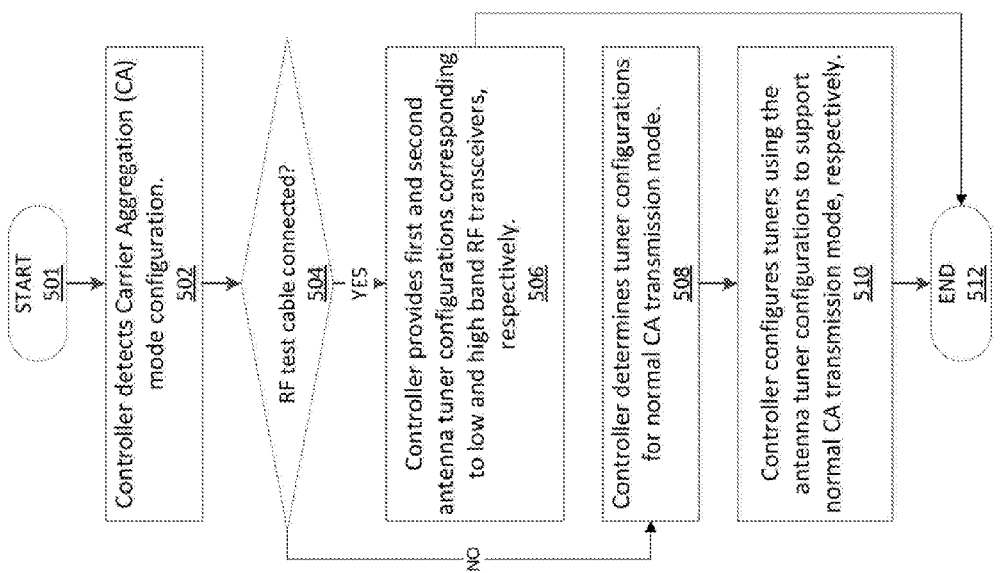
FIG. 5 is a flow chart illustrating one embodiment of a method for configuring multiple tunable antenna matching circuits to support a carrier aggregation (CA) test mode, according to one embodiment.
Figure 6:
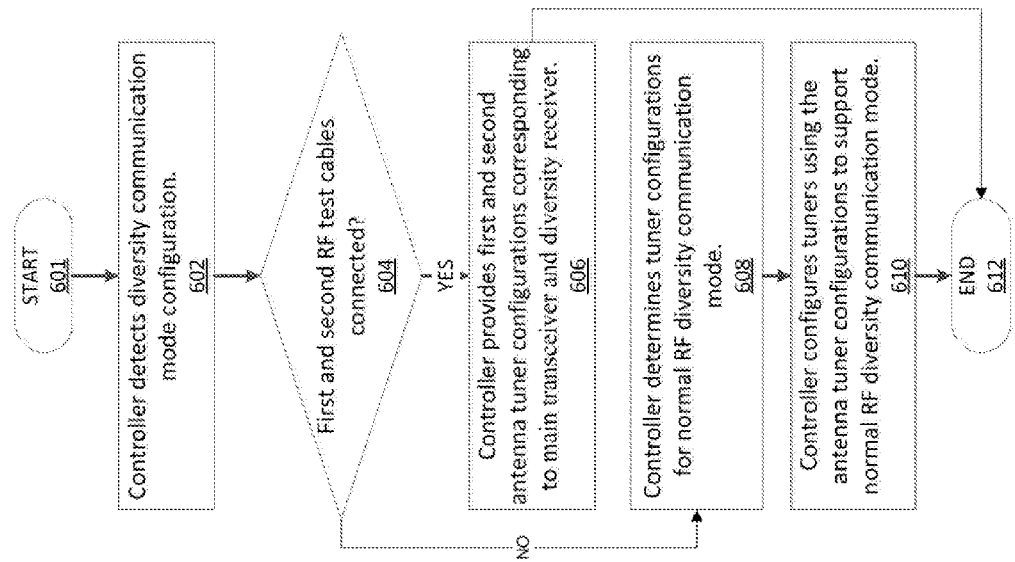
FIG. 6 is a flow chart illustrating one embodiment of a method for configuring multiple tunable antenna matching circuits to support a RF diversity receiver test mode, according to one embodiment.

FIGS. 4-6 are flow charts illustrating an embodiment of the method by which the above processes of the illustrative embodiments can be implemented. Although the methods illustrated by FIGS. 4-6 may be described with reference to components and functionality illustrated by and described in reference to FIGS. 1-3, it should be understood that this is merely for convenience and alternative components and/or configurations thereof can be employed when implementing the methods. Certain portions of the methods may be completed by tuner configuration utility 112 executing on one or more processors (DSP 126) within wireless communication device 100 (FIG. 1) or a processing unit or controller 120 (FIGS. 1-3). The executed processes then control specific operations of or within RFFE 200/300. For simplicity in describing the method, all method processes are described from the perspective of controller 120.

FIG. 4 illustrates one embodiment of a method for configuring a tunable antenna matching circuit to support a test mode. The method of FIG. 4 begins at initiator block 401 and proceeds to decision block 402 at which controller 120 determines whether an RF test cable is connected between test equipment and a test connector while a corresponding transceiver is operational. In response to determining that the RF test cable is connected between test equipment and the test connector while the corresponding transceiver is operational, controller 120 provides first antenna tuner configuration for the corresponding RF transceiver to support test mode (block 404). However, in response to determining that the RF test cable is not connected between test equipment and the test connector while the corresponding transceiver is operational, controller 120 provides a second antenna tuner configuration for the corresponding RF transceiver to support normal device operation (block 406). The process ends at block 408.

FIG. 5 illustrates one embodiment of a method for configuring multiple tunable antenna matching circuits to support a carrier aggregation (CA) test mode. The method of FIG. 5 begins at initiator block 501 and proceeds to block 502 at which controller 120 detects that a transceiver is operating within or configured for a carrier aggregation (CA) mode. Controller 120 determines whether an RF test cable is connected between test equipment and a test connector while the corresponding transceiver is operating within the CA mode (decision block 504). In response to determining that the RF test cable is connected between test equipment and the test connector while the corresponding transceiver is operating within the CA mode, controller 120 provides first and second antenna tuner configurations corresponding to low and high band RF transceivers, respectively (block 506). However, in response to determining that the RF test cable is not connected between test equipment and the test connector while the corresponding transceiver is operating within the CA mode, controller 120 determines/identifies first and second antenna tuner configurations corresponding to low and high band RF transceivers for a normal or non-test CA transmission mode, respectively (block 508). When controller 120 has determined the antenna tuner configurations for the normal CA transmission mode, controller 120 configures the antenna tuners using the respective antenna tuner configurations (block 510). The process ends at block 512.

FIG. 6 illustrates one embodiment of a method for configuring multiple tunable antenna matching circuits to support a RF diversity receiver test mode. The method of FIG. 6 begins at initiator block 601 and proceeds to block 602 at which controller 120 detects that a transceiver is operating within or configured for a RF diversity communication mode. Controller 120 determines whether an RF test cable is connected between test equipment and a test connector while the corresponding transceiver is operating within the RF diversity communication mode (decision block 604). In response to determining that the RF test cable is connected between test equipment and the test connector while the corresponding transceiver is operating within the RF diversity communication mode, controller 120 provides first and second antenna tuner configurations corresponding to main RF transceiver and diversity receiver, respectively (block 606). However, in response to determining that the RF test cable is not connected between test equipment and the test connector while the corresponding transceiver is operating within the RF diversity communication mode, controller 120 determines/identifies first and second antenna tuner configurations corresponding to main RF transceiver and diversity receiver for a normal or non-test RF diversity communication mode, respectively (block 608). In response to determining antenna tuner configurations for the normal RF diversity communication mode, controller 120 configures the antenna tuners using the respective antenna tuner configurations (block 610). The process ends at block 612.

The flowchart and block diagrams in the various figures presented and described herein illustrate the architecture, functionality, and operation of possible implementations of systems, methods and computer program products according to various embodiments of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Thus, while the method processes are described and illustrated in a particular sequence, use of a specific sequence of processes is not meant to imply any limitations on the disclosure. Changes may be made with regards to the sequence of processes without departing from the spirit or scope of the present disclosure. Use of a particular sequence is therefore, not to be taken in a limiting sense, and the scope of the present disclosure extends to the appended claims and equivalents thereof.

In some implementations, certain processes of the methods are combined, performed simultaneously or in a different order, or perhaps omitted, without deviating from the spirit and scope of the disclosure. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A radio frequency front end (RFFE) system within a wireless communication device, the system comprising:
    a first antenna tuner having a low band tunable matching circuit, a high band tunable matching circuit and a matching circuit diplexer, the first antenna tuner for transforming an impedance of a first antenna of the wireless communication device;
    a first low band transceiver having a low band transceiver output connection to the first antenna;
    a first high band transceiver having a high band transceiver output connection to the first antenna;
    at least one radio frequency (RF) test connector including a first RF test connector, wherein the first RF test connector is coupled between the first antenna and the first antenna tuner; and
    a controller coupled to said first antenna tuner, said first low band transceiver, and said first high band transceiver and which:
        detects when a first RF test cable is connected to the first RF test connector, the connection of first RF test cable resulting in removing the low band transceiver output connection and the high band transceiver output connection to the first antenna;
        in response to detecting that the first RF test cable is connected to the first RF test connector, provides at least one configuration of a first set of antenna tuner configurations associated with a presence of the connected first RF test cable; and
        in response to detecting that none of the at least one RF test connector is connected to a corresponding RF test cable and each active transceiver of the first low band transceiver and the first high band transceiver is connected to its corresponding antenna, provides at least one configuration of a second set of antenna tuner configurations associated with each active transceiver being connected to its corresponding antenna.

2. The system of claim 1, wherein the first RF test connector is a single, first RF test point and in response to detecting that the first RF test cable is connected to the first RF test connector, the controller:
    identifies, using a current transceiver configuration, an RF test that is being performed from among (a) one of a low band RF transmitter test and a high band RF transmitter test, (b) one of a low band RF receiver test and a high band RF receiver test, (c) low and high band RF transmitter tests, and (d) low and high band RF receiver tests;
    selects, based on the identified RF test, an antenna tuner configuration from among the first set of antenna tuner configurations; and
    provides the selected antenna tuner configuration for the identified RF test in response to detecting that the first RF test cable is connected to the first RF test point.

3. The system of claim 2, wherein:
    the RF test is a carrier aggregation (CA) test performed using the single RF test point and which simultaneously utilizes a first propagation path corresponding to the low band transceiver and a second propagation path corresponding to the high band transceiver;
    the first and second propagation paths are simultaneously utilized during CA operation, the first propagation path includes a path segment via the low band tunable matching circuit and the second propagation path includes a path segment via the high band tunable matching circuit, while the matching circuit diplexer enables isolation of the simultaneously propagating RF test signals between the first low band transceiver and the first high band transceiver; and
    the selected antenna tuner configuration enables both the low band transceiver and the high band transceiver to be matched and diplexed to test equipment connected to the single RF test point.

4. The system of claim 2, wherein:
    if the first RF test cable is connected to the first RF test point, the first antenna matching circuit is coupled to RF test equipment that has a first known impedance which is substantially equivalent to each of a second impedance at the low band transceiver output and a third impedance at the high band transceiver output, respectively, and if the first RF test cable is not connected to the first RF test point, the first antenna matching circuit is coupled to the first antenna having a fourth known impedance which is substantially different from the second and third impedances.

5. The system of claim 4, wherein:
    the first known impedance is 50 ohms and said first RF test point is a 50 ohm test point; and
    each of said first set of antenna tuner configurations associated with low and high band operation serves to convert the 50 ohm impedance at the low band transceiver output and the high band transceiver output to the 50 ohm impedance associated with the RF test equipment connected to the first RF test point, and each of said second set of antenna tuner configurations associated with low and high band operation serves to convert the 50 ohm impedance at the low band transceiver output and the high band transceiver output to a complex conjugate of the fourth impedance.

6. The system of claim 1, wherein the at least one RF test connector comprises multiple RF test connectors and in response to detecting that the first RF test cable is connected to the first RF test connector and at least one of the at least one RF test connector is not connected to at least one other RF test cable, the controller:
    provides at least one configuration of a third set of antenna tuner configurations associated with the first RF test cable being connected and at least one configuration of a fourth set of antenna tuner configurations associated with the at least one other RF test cable not being connected.

7. The system of claim 1, further comprising:
    a second antenna tuner coupled to the controller and a diversity antenna, wherein the first antenna and the diversity antenna form a diversity antenna system that is utilized by the RFFE to propagate communication signals;

a second RF test connector located between the diversity antenna and the second antenna tuner;

wherein the controller:
- detects when a second RF test cable is connected to the second RF test connector, the connection of the second RF test cable resulting in removing any associated transceiver output connection to the diversity antenna; and
- in response to detecting that the second RF test cable is connected to the second RF test connector while the first RF test cable is connected to the first RF test connector, respectively providing a main antenna tuner configuration associated with the first antenna tuner and a diversity antenna tuner configuration associated with the second antenna tuner, which configurations support performance of an RF test for propagation of communication signals using the diversity antenna system.

8. The system of claim 7, wherein:
the matching circuit diplexer is configured to enable frequency separation for simultaneously propagating RF test signals, whereby the main antenna tuner configuration associated with the first antenna tuner and the diversity antenna tuner configuration associated with the second antenna tuner enable the first antenna tuner and the second antenna tuner to allow simultaneous low and high band operation with low loss to propagating RF test signals.

9. The system of claim 1, wherein:
the at least one antenna tuner configuration of the first set of antenna tuner configurations associated with the presence of the first RF test cable is provided using at least one of a pre-established algorithm and a look-up table.

10. The system of claim 9, wherein the controller:
selects, using respective RF communication signal parameters, an antenna tuner configuration that is associated with an RF test being performed.

11. A wireless communication device comprising:
at least one antenna;
an RFFE system having:
- a first antenna tuner having a low band tunable matching circuit, a high band tunable matching circuit and a matching circuit diplexer, the first antenna tuner for transforming an impedance of a first antenna of the wireless communication device;
- a first low band transceiver having a low band transceiver output connection to the first antenna;
- a first high band transceiver having a high band transceiver output connection to the first antenna;
- at least one RF test connector including a first RF test connector, wherein the first RF test connector is coupled between the first antenna and the first antenna tuner; and
- a controller coupled to said first antenna tuner, said first low band transceiver, and said first high band transceiver and which:
  - detects when a first RF test cable is connected to the first RF test connector, the connection of first RF test cable resulting in removing the low band transceiver output connection and the high band transceiver output connection to the first antenna;
  - in response to detecting that the first RF test cable is connected to the first RF test connector, provides at least one configuration of a first set of antenna tuner configurations associated with a presence of the connected first RF test cable; and
  - in response to detecting that none of the at least one RF test connector is connected to a corresponding RF test cable and each active transceiver of the first low band transceiver and the first high band transceiver is connected to its corresponding antenna, provides at least one configuration of a second set of antenna tuner configurations associated with each active transceiver being connected to its corresponding antenna.

12. The wireless communication device of claim 11, wherein the first RF test connector is a single, first RF test connector and in response to detecting that the first RF test cable is connected to the first RF test connector, the controller:
- identifies, using a current transceiver configuration, an RF test that is being performed from among (a) one of a low band RF transmitter test and a high band RF transmitter test, (b) one of a low band RF receiver test and a high band RF receiver test, (c) low and high band RF transmitter tests, and (d) low and high band RF receiver tests;
- selects, based on the identified RF test, an antenna tuner configuration from among the first set of antenna tuner configurations; and
- provides the selected antenna tuner configuration for the identified RF test in response to detecting that the first RF test cable is connected to the first RF test point.

13. The wireless communication device of claim 12, wherein:
- the RF test is a carrier aggregation (CA) test performed using the single RF test point and which simultaneously utilizes a first propagation path corresponding to the low band transceiver and a second propagation path corresponding to the high band transceiver;
- the first and second propagation paths are simultaneously utilized during CA operation, the first propagation path includes a path segment via the low band tunable matching circuit and the second propagation path includes a path segment via the high band tunable matching circuit, while the matching circuit diplexer enables isolation of the simultaneously propagating RF test signals between the first low band transceiver and the first high band transceiver; and
- the selected antenna tuner configuration enables both the low band transceiver and the high band transceiver to be matched and diplexed to test equipment connected to the single RF test point.

14. The wireless communication device of claim 12, wherein:
if the first RF test cable is connected to the first RF test point, the first antenna matching circuit is coupled to RF test equipment that has a first known impedance which is substantially equivalent to each of a second impedance at the low band transceiver output and a third impedance at the high band transceiver output, respectively, and if the first RF test cable is not connected to the first RF test point, the first antenna matching circuit is coupled to the first antenna having a fourth known impedance which is substantially different from the second and third impedances.

15. The wireless communication device of claim 14, wherein:
the first known impedance is 50 ohms and said first RF test point is a 50 ohm test point; and each of said first set of antenna tuner configurations associated with low and high band operation serves to convert the 50 ohm impedance at the low band transceiver output and the high band transceiver output to the 50 ohm impedance associated with the test equipment connected to the first RF test point, and each of said second set of antenna tuner configurations associated with low and high band operation serves to convert the 50 ohm impedance at the low band transceiver output and the high band transceiver output to a complex conjugate of the fourth impedance.

16. The wireless communication device of claim 11, wherein the at least one RF test connector comprises multiple RF test connectors and in response to detecting that the first RF test cable is connected to the first RF test connector and at least one of the at least one RF test connector is not connected to an RF test cable, the controller:
provides at least one configuration of a third set of antenna tuner configurations associated with the first RF test cable being connected and at least one configuration of a fourth set of antenna tuner configurations associated with at least one other RF test cable not being connected.

17. The wireless communication device of claim 11, further comprising:
a second antenna tuner coupled to the controller and a diversity antenna, wherein the first antenna and the diversity antenna form a diversity antenna system that is utilized by the RFFE to propagate communication signals;
a second RF test connector located between the diversity antenna and the second antenna tuner;
wherein the controller:
detects when a second RF test cable is connected to the second RF test connector, the connection of the second RF test cable resulting in removing any associated transceiver output connection to the diversity antenna; and
in response to detecting that the second RF test cable is connected to the second RF test connector while the first RF test cable is connected to the first RF test connector, respectively providing a main antenna tuner configuration associated with the first antenna tuner and a diversity antenna tuner configuration associated with the second antenna tuner, which configurations support performance of an RF test for propagation of communication signals using the diversity antenna system.

18. The wireless communication device of claim 17, wherein:
the matching circuit diplexer is configured to enable frequency separation for simultaneously propagating RF test signals, whereby the main antenna tuner configuration associated with the first antenna tuner and the diversity antenna tuner configurations associated with the second antenna tuner enable the first antenna tuner and the second antenna tuner to allow simultaneous low and high band operation with low loss to propagating RF test signals.

19. The wireless communication device of claim 11, wherein:
the at least one antenna tuner configuration of the first set of antenna tuner configurations associated with the presence of the RF test cable is provided using at least one of a pre-established algorithm and a look-up table.

20. The wireless communication device of claim 19, wherein the controller:
selects, using respective RF communication signal parameters, an antenna tuner configuration that is associated with an RF test being performed.

* * * * *